United States Patent [19]

Schulte

[11] 4,138,925

[45] Feb. 13, 1979

[54] DEBURRING AN INSIDE WELDING SEAM OF HOLLOW PROFILES

[75] Inventor: Franz-Josef Schulte, Werl, Fed. Rep. of Germany

[73] Assignee: Mannesmann Aktiengesellschaft, Düsseldorf, Fed. Rep. of Germany

[21] Appl. No.: 852,451

[22] Filed: Nov. 17, 1977

[30] Foreign Application Priority Data

Nov. 19, 1976 [DE] Fed. Rep. of Germany ....... 2653236

[51] Int. Cl.² .............................................. B23D 7/06
[52] U.S. Cl. ..................................................... 90/24 B
[58] Field of Search ..................... 90/24 B, 24 R; 83/1

[56] References Cited

U.S. PATENT DOCUMENTS

| | | |
|---|---|---|
| 2,778,281 | 1/1957 | Allardt ................................. 90/24 B |
| 3,165,028 | 1/1965 | Keska ................................... 90/24 B |
| 3,395,614 | 8/1968 | Dodson ................................ 90/24 B |

*Primary Examiner*—Gil Weidenfeld
*Attorney, Agent, or Firm*—Smyth, Pavitt, Siegemund, Jones & Martella

[57] ABSTRACT

A deburring device has a fixed or pivotable head on a rod or shaft which projects into the tube, pipe or other hollow to be deburred. The head has an oblique bore in which sits a tube; a cutting edge is provided along and around one end of that tube. Turning of the edge permits easy use of a new cutting edge portion. The position of the cutting tube is adjusted by a hollow nut through which runs also the removed burr. Guide rolls on the shaft position the tool, whereby rolls on the opposite side of the cutter are resiliently journalled.

9 Claims, 4 Drawing Figures

DEBURRING AN INSIDE WELDING SEAM OF HOLLOW PROFILES

BACKGROUND OF THE INVENTION

The present invention relates to deburring the welding seam of tubes and hollow profiles from the inside.

Cutters or milling tools are conventionally being used for deburring the welding seam of tubes, pipes or other hollow profiles. The respective tool is connected to a holding rod or the like, and projects into the interior of the tube through the not yet closed gap of the skelp, to remove the burr on a running basis. This particular deburring arrangement depends to a considerable extent on the dimensions of the tube being made, particularly the internal diameter is an important factor so that upon changing the tube or type of tube to be made, the deburring equipment must be changed too.

Another disadvantage of the known deburring equipment is the rather rapid wear of the tool requiring correspondingly frequent exchange and commensurate long down times. The useful life of the tool is further limited by occasional fracture of the soldered-on hard metal cutters, due to the arising stress when the soldered connection is being made.

DESCRIPTION OF THE INVENTION

It is an object of the present invention to provide a new and improved device for deburring the inside welding seam of longitudinally seam welded tubes, pipes or other hollow profiles; the improvement relates particularly to facilitating tool changes and to the reduction of down time.

It is another object of the present invention to provide a new and improved device for deburring the inside welding seams of tubes, pipes, etc., which is more easily adaptable to different diameters of the hollow.

In accordance with the preferred embodiment of the present invention, it is suggested to provide a shaft with a head for purposes of projection into the gap of a folded skelp. The head is to have an obliquely oriented bore in which is adjustably seated a tube whose one end is constructed as cutting edge, preferably in the configuration of plural contiguous arcs, and only one such arc, or more generally, a relatively small portion of the edge should project beyond the periphery of the head. A hollow screw adjusts the position of that cutting tube, particularly the amount the cutting edge protrudes from the head. The head may be integral with or pivotally mounted to the shaft. Spring loaded rolling elements position the shaft in relation to the inside surface of the hollow to be deburred.

In the case of wear, the cutting tube is simply turned so that a different edge portion becomes the cutter proper. This change does not require readjustment of the cutting depth. The cut off burr is guided through the cutting tube and the hollow adjusting screw.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates a holding rod 1 which is mounted on the outside of a tube to be deburred from the inside. Rod or shaft 1 projects through the not yet closed gap of the skelp from which a tube or other hollow is being made.

Figure 1:
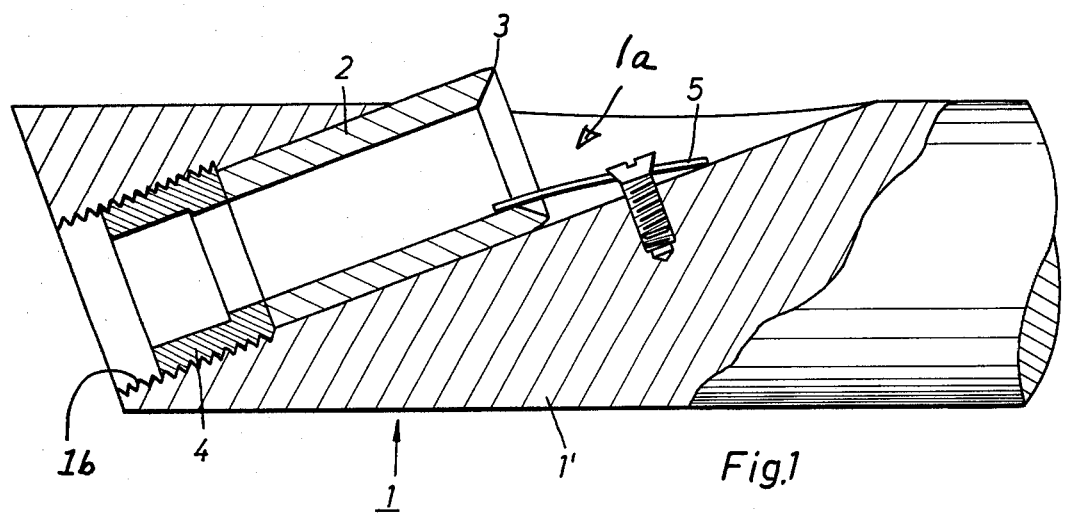
FIG. 1 is a longitudinal section through a deburring device having an integral tool holder.

The head portion 1' of holding rod 1 is provided with an obliquely oriented bore 1a whose front portion has a nut threading 1b. The bore 1a has an axis which is oriented by about 20° to the axis of the rod 1.

Bore 1a receives a tubular cutting tool 2 which sits on a hollow adjusting screw 4 being received by threading 1b. The tubular cutter 2 has an inwardly bevelled end defining a cutting edge 3. A portion of that edge projects outwardly from bore 1a, and the degree of protruding depends on how deeply a hollow screw 4 has been threaded into socket portion 1b. Adjustment here determines the cutting depth; the tube 2 just rests on the hollow screw 4.

The cut off burr enters the hollow tube 2 and passes also through the hollow nut 4, to be laid onto the bottom part of the inside wall of the tube to be deburred. That orientation is optional; the main apsect is that the burr is guided through the tool (2, 4) and out again. A guide strip 5, being bolted to head 1' assists the guiding of the burr through the tool as stated.

Figure 3:
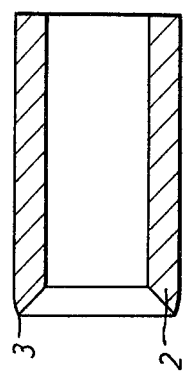
FIG. 3 is a section through the cutter.
Figure 4B:
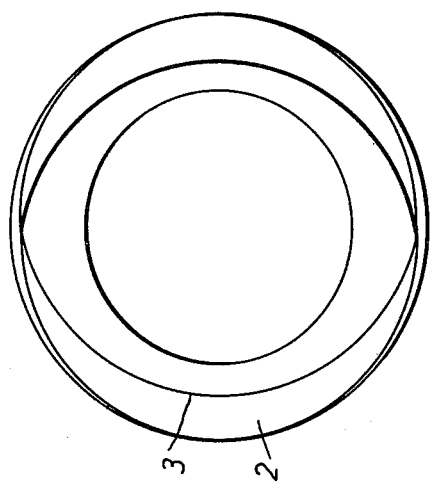
FIGS. 4a and 4b are front views of differently contoured cutting edges of such a cutter.
Figure 4A:
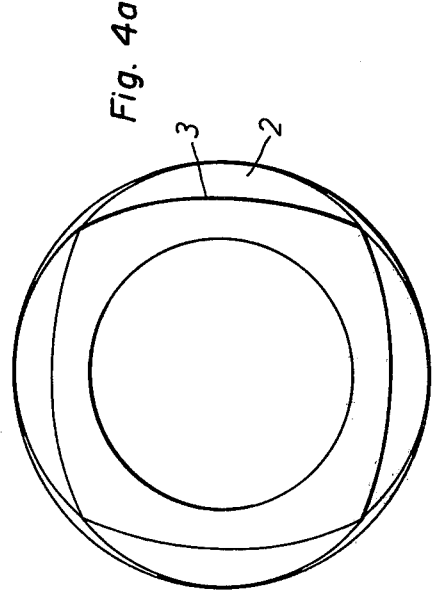

The rod 1 may be guided or held in the hollow being deburred by means of rollers as is known per se. These rollers may be regular ones or balls. In operation, cutting edge 3 cuts off the passing burr. The cutting edge 3 may be just a circular edge commensurate with the front end of tube 2. Other and preferred configurations of the cutting edge can best be taken from FIGS. 4a or 4b, showing two different versions, but still in accordance with the same principle. The cutting edge as per FIG. 3 is composed of four arcs, FIG. 4b has two arcs. Each such arcs or arcuate edge portions is a cutting edge being used at a time. Use of one or the other type of edge configurations depends on the size of the welding seam, so that for different seams the same head 1' and rod 1 can be used, but a larger seam requires the larger type edge as per FIG. 4b.

Whenever one of the cutting arcs has worn out, one simply turns the tool tube 2 by 90° as per FIG. 4a or by 180° as per FIG. 4b. In the simplified version in which cutting edge 3 is just circular, one simply turns tube 2 by an angle corresponding approximately to the width of the burr. In either case, no new adjustment is needed as to cutting depth; as long as the edge has still an unworn portion screw 4 remains in the adjusted position. Only after all portions of the edge 3 have worn, one must take tube 2 out, and either replace it by a new one, or one regrinds and refinishes the edge. This may lead to a shortening of the tube 2 as such so that readjustment of the screw 4 is needed to restore the cutting depth.

Figure 2:
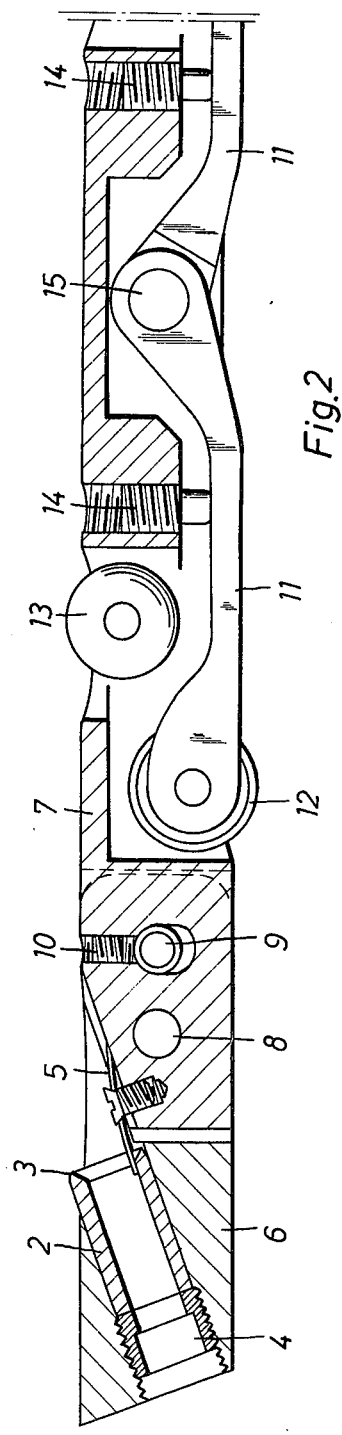
FIG. 2 is a similar longitudinal section but having a tool head that is pivoted to the holder.

The device shown in FIG. 1 is a somewhat simplified version of the inventive deburring device, to be used for larger tubes having an inner diameter in excess of 15 mm. The tool as such is adapted to the respective tool diameter by the carrying and support equipment that runs rod 1 through the tube. FIG. 2 shows a construction in which the tool carrying equipment, a shaft 7, is adapted for limited adjustment of the equipment to different tube diameters.

The tool carrying head is denoted here with reference numeral 6 which is provided with a bore that receives cutting tube 2 whose disposition is adjusted by nut 4. Head 6 is pivoted to shaft 7 by means of a pivot pin 8, and the pivot angle is changeable by an adjustment bolt 10. Following adjustment, the head 6 is clamped to shaft 7 by a clamp screw 9. A change in adjustment here is actually a rather coarse one as regards to the diameter of the hollow to which the tool is adjusted. The edge 3 of tube 2 may have any of the configurations as aforedescribed.

The shaft 7 carries several guide rolls. First guide rolls 12 are disposed opposite to the operative cutting edge portion of tube 2 and are journalled on spring arms 11; only one roll 12 is shown, the other one is to the right of the Figure and in the same plane. The spring arms are pivoted on a pin 15, and screws 14, each having a front end stop, limit the pivoting of the arms 11 towards the axis of the shaft 7. The screws 14 are adjusted so that upon abutment of the arms 11 against the stops, rolls 12 run on the tube's wall, and cutting tube 2 has the proper cutting position and depth. This particular adjustment is the fine adjustment of the tool holding equipment to the particular dimensions of the hollow to be deburred.

Reference numeral 13 refers to another, fixedly journalled roll whose disposition is commensurate with the cutting depth. In view of rolls 12, 13, one could use conventional ball rollers.

The invention is not limited to the embodiments described above but all changes and modifications thereof not constituting departures from the spirit and scope of the invention are inteded to be included.

I claim:
1. Apparatus for deburring an internal longitudinal welding seam in tubes, pipes or other hollow profiles, comprising:
   a shaft for projecting into the tube and having a head, said head having an obliquely oriented bore;
   a cutting tube disposed and held in the bore having a cutting edge extending around one axial end of the cutting tube, a limited portion of the edge protruding beyond an outer periphery of the shaft; and
   hollow adjustment means in the bore for adjusting the disposition of the cutting tube in axial direction of the cutting tube in axial direction of and in the bore, the cut off burr being guided through the cutting tube and the hollow adjustment means.
2. Apparatus as in claim 1, said head being integral with the shaft.
3. Apparatus as in claim 1, said head being pivotally mounted to the shaft for pivoting about an axis which extends transversely to a longitudinal shaft axis.
4. Apparatus as in claim 1, said bore and said shaft each having axes, said axes being oriented at about 20° to each other.
5. Apparatus as in claim 1, said cutting edge being composed of arcuate sections.
6. Apparatus as in claim 1, including resiliently mounted rolling guide means for the shaft.
7. Apparatus as in claim 6, said resiliently mounted guide means being disposed opposite the protruding cutting edge.
8. Apparatus as in claim 6, said guide means being adjustable to accommodate the tool to different diameter hollows.
9. Apparatus as in claim 1, said bore having a threaded socket, said adjusting means being a hollow nut in the socket, said cutting tube resting on the nut.